Patented Feb. 18, 1941

2,232,278

UNITED STATES PATENT OFFICE 2,232,278

METHOD OF COLORING FRUIT

Jagan N. Sharma, Los Angeles, Calif., assignor to Food Machinery Corporation, San Jose, Calif., a corporation of Delaware No Drawing. Application September 15, 1938, Serial No. 230,113

19 Claims. (Cl. 99—103)

This invention relates to improvements in methods of imparting a varietal coloration to citrus fruits. As disclosed in Patent No. 1,909,860 issued to Rodney B. Harvey, citrus fruits vary in color but variations from the standard varietal color do not necessarily mean that the fruit is immature or of low quality. This patent, among other things, disclosed a method of enhancing the varietal color of citrus fruit by subjecting the fruit to the action of an oleaginous liquid containing a suitable dye or coloring substance. It has been found, however, that when some of the lighter mineral oils and distillates are used as a carrier for the dye or other coloring material, the fruit, although improved in color, has a tendency to shrink and wither.

The present invention is particularly directed to a method whereby the varietal color of citrus fruit (or other fruits provided with an oily and/or waxy outer skin or peel) may be enhanced without destroying or impairing the natural texture or appearance of the fruit and without causing the fruit to wither or dry and become wrinkled within a short period of time after treatment.

Generally stated, the present invention discloses certain materials and conditions and methods of application whereby the varietal color of fruit may be enhanced without the aforementioned undesirable effects.

The present application is a continuation-in-part of Serial No. 731,265, filed June 19, 1934, now Patent No. 2,133,404, issued Oct. 18, 1938.

Generally stated, my invention pertains to the impregnation of the skin or peel of fruit with a coloring substance which is preferentially soluble in the oily or waxy constituents of the skin or peel of the fruit. The methods of this invention distinguish from those disclosed heretofore in that the coloring substance employed is preferably in the form of particles and not in the form of a solution. It is further based upon the discovery that when a powdered or finely divided coloring substance or oil-soluble dye is applied to fruit at ordinary or normal temperatures, such as, for example, temperatures below 80° F., such dye or coloring substance will not impregnate the skin or peel of the fruit and therefore it is not possible to commercially enhance the varietal color of fruit by applying a powdered or finely divided dye to the surface of fruit, even though the fruit are rubbed or brushed at such normal temperatures and in the presence of the solid dye particles. If, however, the particles of coloring substance are applied to the fruit and the fruit is brushed at temperatures above 90° F., the dye impregnates the skin or peel of the fruit with remarkable rapidity, thereby permitting the fruit to develop an enhanced natural color within a short period of time, i. e., a period of time which does not interfere with the schedule of operations normally carried out at a citrus packing plant.

In addition to the simple embodiment referred to hereinabove, my invention contemplates the application of a waxy mixture including particles of coloring substance, followed by the step of rubbing or spreading the mixture over the surface of the fruit so as to cause the dye or coloring substance to impregnate the skin or peel. The solid material used in conjunction with the dye may be a finely divided inorganic material or organic material.

In a still further modification of the invention the fruit may be waxed in the usual or customary manner and the powdered dye or coloring material then applied to the surface and the fruit rubbed or polished while being maintained at a temperature above about 90° F.

A still further modification of the process contemplates the formation of a waxy mixture or mass containing the dye or coloring substances, this waxy mixture being then applied to the fruit in the form of a mist or fog and the fruit then brushed thoroughly while being maintained at temperatures above 90° F. and preferably sufficient to soften the waxy mixture but insufficient to injure the fruit. The brushing operation here removes excess waxy material from the crevices and pits which characterize the surface texture of substantially all citrus fruit and at the same time permits dye or coloring substance to pass from the waxy carrier or mixture into the skin or peel.

In all events, the fruit after treatment is suitably colored so that its natural varietal color is enhanced. At the same time the fruit is provided with a very thin, practically imperceptible film of waxy material which retards shrinkage, withering and decay of the fruit.

An object of this invention, therefore, is to provide a process whereby the varietal color of fruit may be enhanced without deleterious effect upon the fruit.

Another object is to provide a method of enhancing the varietal color of citrus fruit without the use of solutions and/or solvents.

A still further object is to provide a method whereby dyes and coloring substances in the form of particles may be used in imparting a desired enhanced varietal coloration to fruit without interfering with or delaying the schedule of operations as normally carried out in a packing house.

These and other objects, uses, advantages, modifications and adaptations of the invention will become apparent to those skilled in the art from the following detailed description of preferred materials, conditions and methods of treatment.

Although the subsequent description will particularly describe the adaptation of the invention to the treatment of citrus fruit, it is to be remembered that other fruits and vegetables provided with a skin or peel which contains oily and waxy constituents such as, for example, tomatoes, eggplants, apples, etc., may be similarly treated.

The dye or coloring substances used should be of the oil-soluble type and may be soluble to some extent in the waxy ingredients employed. Dyes which are more readily soluble in the natural oils and waxes occurring in the skins and peels of citrus fruit are preferred for use in the treatment of citrus fruit. As long as the dye is soluble in the natural oils and waxes of the skin or peel of the fruit, it may be insoluble in the waxy compositions used in certain of the modifications of the process. When used on citrus fruit, the dye substance should be stable in the presence of the acids normally found in the skin or peel of the fruit and should not fade upon exposure to sunlight. The methylated aniline dyes, such as xylidinediazo compounds, are eminently suitable for use in this process. A dye constituted of methylated aniline plus azo-beta-naphthol or of aniline plus beta-naphtholamine, or of ortho-toluidine plus beta-naphtholamine, is satisfactory.

The dyes or coloring substance should be in a state of very fine division, preferably passing a 200 mesh sieve. When a mixture of waxy material or waxy carrier and dye substance is to be used, the mixture may be produced in any suitable manner as, for example, by trituration, passage of the mixture through colloid mills, or simply prolonged agitation while the waxy carrier is maintained in a liquid or fluid condition.

When a waxy composition is to be employed and the dye substance is practically insoluble in the waxy ingredients, the resulting mixture should assume the characteristics of a colloidal suspension. From about 1% to 20% of the dye can be thus incorporated into the waxy carrier. The dyes used should have a shade, color or tone adapted to enhance the natural varietal color of the fruit which is to be treated. Deep red dyes with an orange tone may be used for citrus fruit as these dyes upon dilution, thinning or absorption into the skin or peel, produce a suitable Valencia orange coloration.

After citrus fruits have been washed and cleaned in any suitable and customary manner (and if desired treated with a mold or decay-inhibiting material), they may be subjected to the process of this invention. In its simplest embodiment, the fruit are dusted with a suitable coloring substance in a state of fine division and then brushed or polished at a temperature of 90° F. or thereabove. Prior to dusting with the coloring substance or dye the fruit may be preheated so that the skin or peel thereof is at a temperature of above 90° F. at the time the dye comes in contact therewith. Or the dusting and/or brushing steps may take place while the fruit are maintained in an atmosphere having a temperature above 90° F. It has been found that fruit may be maintained in an atmosphere heated to say 140° F. for a period of about 2 minutes without injuring the fruit or imparting any undesirable characteristics thereto. Temperatures as high as 180° F. may be used for slightly shorter periods of time. The entire brushing operation can therefore take place in an enclosed housing supplied with heat so as to facilitate the impregnation of the skin or peel with the dye. The length of the brush rolls can be correlated with the speed of the fruit passing therethrough and the temperature maintained so that the entire operation can be conducted in timed relation to the other normal steps of packing house operation.

In one of the alternative forms of the invention the fruit may be waxed as, for example, by means of the old slab wax process in which the wax is applied to the fruit by means of brushes contacting slabs of wax during a portion of their travel, or by means of a spray wax process, or in any other suitable manner. Fruit provided with a minute coating of suitable wax or wax composition can then be dusted with the finely divided dye and again brushed or polished. The application of the original coating of wax facilitates the adherence of the dust to the fruit, the final brushing or polishing uniformly distributing the particles over the surface and permitting the dye to pass into the skin or peel. The impregnation of the skin or peel is facilitated by the use of temperatures above 90° F. as described heretofore.

Instead of employing the dye or coloring substance alone, a mixture or composition containing dye particles may be applied to the fruit. For example, the dye may be mixed with a solid wax such as carnauba wax, beeswax, ceresin wax, paraffin wax or other waxy material or combination of waxy materials which are ordinarily substantially solid at normal atmospheric temperatures. Substances such as the metal salts of stearic, oleic and palmitic acids or the like (such as, for example, zinc stearate, aluminum stearate, aluminum oleate, aluminum palmitate, etc.) may be employed as carriers. The carriers or diluents instead of being waxes or salts of the fatty acids, may also comprise substantially inert, finely divided material such as, for example, basic magnesium carbonate, diatomaceous earth, bentonite or bentonitic clays, talc, steatite, pyrophyllite or other minerals having a naturally flake-like characteristic. Some of the metallic stearates and palmitates have sterilizing properties and fruit treated with mixtures of dye and such stearates and palmitates, are dyed and simultaneously rendered more resistant to decay. Any suitable proportion of dye and carrier may be employed although it has been found that the treating mixture may contain from 2% to 15% of the oil-soluble dye and such mixture will produce eminently satisfactory results.

In a still further form of the invention the citrus fruit may be subjected to a mist or finely divided spray of a color-containing composition. For example, a mixture containing from about 1% to 20% of the dye (the rest consisting of suitable waxes) may be reduced to a substantially liquid form (the precise temperature varying with the melting point of the composition and ordinarily ranging from about 140° F. to 190° F.) and the liquid wax then atomized through suitable nozzles. The dye may be carried in this liquid wax in the form of solid particles. Very fine atomization resulting in the production of a fine mist is desirable as only a very thin film of this composition on the fruit should be produced. In most instances it will be found that this composition will solidify immediately upon contact with the cooler fruit.

The fruit together with their waxy coatings, are passed into a chamber and subjected to the action of a heated atmosphere. While maintained in this heated atmosphere, it will be found that the particles of dye tend to migrate from the waxy coating into the outer layer or layers of the skin or peel, particularly when the dye is preferentially and selectively soluble in the natural oils and waxes of the skin or peel. While the fruit are maintained in this heated atmosphere (which may be at any temperature above 90° F. and preferably between 90° F. and about 140° F.), they are subjected to a vigorous brushing by means of rolls and the like. Brushing apparatus similar to that used in cleaning citrus fruit is eminently suited for this purpose. Practically the only modification needed in existing brushing equipment is the provision of a housing around the rolls, through which housing heated air may be allowed to pass so as to maintain the fruit in the aforesaid heated atmosphere during the brushing operation. The temperatures used may be stated to be those adapted to soften the waxy composition and thereby facilitate impregnation of the skin or peel with the dye without deleteriously affecting or injuring the fruit.

In the last-described mode of operation the fruit, immediately after the application of the atomized composition, has a speckled or spotted appearance because citrus fruits have a characteristically rough-textured surface or skin and the particles of dye tend to collect in the pits and crevices of the skin. During the subsequent brushing, excess quantities of waxy composition are removed from the fruit and the excess dye or coloring substance present in the pits or crevices of the surface is eliminated. The brushing should be continued until a minute, practically indiscernible film of wax remains on the fruit, whereupon the fruit is discharged from the rolls. The fruit thus treated will be found to be uniformly colored, it being understood that by the term "uniformly colored" reference is had to a uniform distribution of the dye or coloring substance over the surface area of the fruit and not actual uniformity of the total color of the fruit, since natural fruit often vary in shade from portion to portion of the surface area.

I claim:

1. In a process of enhancing the varietal color of fruits and vegetables, the steps of applying particles of coloring substance in a state of fine division to the surface of whole fruits and vegetables, and brushing such fruits and vegetables at temperatures above 90° F. whereby the coloring substance is caused to impregnate the skin or peel of such fruits and vegetables.

2. In a method of enhancing the varietal color of citrus fruits, the steps of applying particles of coloring substance in a state of fine division to the skin or peel of citrus fruit, and rubbing said fruit in the presence of said coloring substance at a temperature above 90° F. whereby the natural waxy coating of the fruit is rendered receptive to said coloring substance and absorbs the same.

3. In a process of imparting a desired varietal coloration to whole citrus fruit, the step of rubbing whole citrus fruit with a finely divided material including particles of oil-soluble dye at a temperature of above 90° F.

4. In a process of enhancing the varietal color of fruits and vegetables, the steps of applying a finely divided mixture comprising a carrier and an oil-soluble coloring substance in a state of fine division to the skin or peel of the fruit, and then rubbing the fruit at a temperature above 90° F. to impregnate the skin or peel with said coloring substance.

5. In a process of enhancing the varietal color of whole citrus fruit, the steps of forming a waxy mixture containing oil-soluble dye in a state of fine division upon the surface of the fruit, and rubbing the fruit at a temperature above 90° F. to cause said dye to impregnate the skin or peel of the fruit.

6. In a process of enhancing the varietal color of whole citrus fruit, the steps of forming a waxy mixture containing oil soluble dye in a state of fine division upon the surface of the fruit, and subjecting the fruit to rubbing at a temperature above 90° F. and for a period of time sufficient to cause the dye to impregnate the skin or peel of the fruit but insufficient to injure the fruit 7. In a process of enhancing the varietal color of fruits and vegetables, the steps of applying a waxy material to the skin or peel of the fruit, then dusting the waxed fruit with a coloring substance in a state of fine division, and rubbing the waxed and dusted fruit at temperatures above 90° F. to cause said coloring substance to impregnate the skin or peel.

8. A method of enhancing the varietal color of whole citrus fruit which comprises: subjecting the fruit to temperatures above 90° F. for a period of time sufficient to soften waxes carried by the surface of the fruit but insufficient to injure the fruit, then applying a coloring substance in a state of fine division to said fruit, and rubbing the fruit while maintaining a temperature above 90° F.

9. In a method of enhancing the varietal color of whole citrus fruit, the steps of forming a waxy mixture containing an oil-soluble dye, applying said mixture to the surface of the fruit, and brushing the fruit while at a temperature above 90° F. to soften said waxy mixture and impregnate the skin or peel with said dye.

10. In a process of enhancing the varietal color of whole citrus fruit, the step of rubbing particles of solid dye and fruit together to cause said dye to impregnate the skin or peel of the fruit.

11. In a process of enhancing the varietal color of whole citrus fruit, the step of rubbing particles of solid dye and fruit together to cause said dye to impregnate the skin or peel of the fruit at a temperature above 90° F.

12. A process of enhancing the varietal color of whole citrus fruit, which includes the step of rubbing fruit with wax and dye to cause said dye to impregnate the skin or peel of the fruit.

13. A process of enhancing the varietal color of whole citrus fruit, which includes the step of rubbing fruit with wax and dye to cause said dye to impregnate the skin or peel of the fruit at a temperature above 90° F.

14. In a process of enhancing the varietal color of whole citrus fruit, the step of rubbing fruit with a solid dye and a solid diluent for the dye to cause said dye to impregnate the skin or peel of the fruit.

15. In a process of enhancing the varietal color of whole citrus fruit, the step of rubbing fruit with a solid dye and a solid diluent for the dye to cause said dye to impregnate the skin or peel of the fruit at a temperature above 90° F.

16. A process of enhancing the varietal color of whole citrus fruit, including the step of rubbing fruit with a dye and a solid diluent for the dye in which the dye is at least partially soluble to cause said dye to impregnate the skin or peel of the fruit.

17. A process of enhancing the varietal color of whole citrus fruit, including the step of rubbing fruit with a dye and a solid diluent for the dye in which the dye is at least partially soluble to cause said dye to impregnate the skin or peel of the fruit at a temperature above 90° F.

18. Method of improving the appearance of citrus fruit which comprises mixing a coloring matter soluble in the natural wax present in the peel of the fruit with a dry solid carrier, applying the mixture to the surface of the fruit, and subjecting the fruit to a temperature between 140° F. and 180° F. until the color is absorbed by the natural wax of the fruit.

19. Method of improving the appearance of citrus fruit which comprises mixing a coloring matter soluble in the natural wax present in the peel of the fruit with a dry solid carrier, applying the mixture to the surface of the fruit, subjecting the fruit to a temperature between 140° F. and 180° F. until the color is absorbed by the natural wax of the fruit, and brushing the surface to remove excess color and to even out irregularities so as to leave a uniform coat of the desired color.

JAGAN N. SHARMA.